United States Patent [19]

Facey et al.

[11] 4,054,405
[45] Oct. 18, 1977

[54] THERMOLUMINESCENT DETECTOR FOR MIXED GAMMA AND FAST NEUTRON RADIATIONS

[75] Inventors: Robert A. Facey, Ottawa; Raynald A. Gravelle, Touraine; Harry Sheffer, Ottawa, all of Canada

[73] Assignee: National Defence of Canada, Canada

[21] Appl. No.: 665,679

[22] Filed: Mar. 10, 1976

Related U.S. Application Data

[62] Division of Ser. No. 543,014, Jan. 21, 1975.

[30] Foreign Application Priority Data

Jan. 30, 1974 Canada .................................. 191390

[51] Int. Cl.$^2$ ............................................. B30B 11/04
[52] U.S. Cl. ................................. 425/405 R; 425/412; 425/415
[58] Field of Search ................. 425/78, 352, 354, 355, 425/405 R, 406, 410, 411, 412, 415

[56] References Cited

U.S. PATENT DOCUMENTS

| | | | |
|---|---|---|---|
| 2,169,281 | 8/1939 | Pfanstiehl | 425/78 |
| 2,437,127 | 3/1948 | Richardson | 425/78 X |
| 2,482,342 | 9/1949 | Hubbert et al. | 425/78 |
| 3,171,192 | 3/1965 | Ortner et al. | 29/182.2 |
| 3,235,643 | 2/1966 | Hoffer | 425/352 X |
| 3,555,597 | 1/1971 | Meadows | 425/78 |
| 3,619,861 | 11/1971 | Lumby | 425/412 |
| 3,797,986 | 3/1974 | Onder | 425/352 |

*Primary Examiner*—J. Howard Flint, Jr.
*Attorney, Agent, or Firm*—Burgess, Ryan and Wayne

[57] ABSTRACT

It has not previously been known to measure, by means of thermoluminescent detectors, both gamma and fast neutron radiation at the same time. The present invention performs such measurements on an equal basis to produce a summed dose reading. The present invention broadly comprises the use of a thermoluminescent phosphor in hydrogenous matrix and the measurement of thermoluminescence due to electron fluence from the matrix into the phosphor for gamma ray dose and recoil proton fluence into the phosphor for fast neutron dose. The invention further embraces the manufacture of a detector and a novel die for use therein.

5 Claims, 2 Drawing Figures

THERMOLUMINESCENT DETECTOR FOR MIXED GAMMA AND FAST NEUTRON RADIATIONS

This is a division, of application Ser. No. 543,014, filed Jan. 21, 1975.

This invention relates to a hot pressing die for processing discs for measurement of radiation dose to incident fast neutrons, or gamma rays, or any combination of fast neutrons and gamma rays.

The importance of such devices lies in the need to measure fast neutron dose in order to estimate correctly the dose or the hazard to humans. This is an urgent requirement of the military and civil defence organizations with regard to nuclear warfare, and also with regard to the dosimetry of nuclear accidents or disasters. It is also of importance in the nuclear industry, both in nuclear power generating facilities, and also in the operation of critical assemblies or reactors, or high energy particle accelerators for industry or for research at universities.

The dosimetry of gamma rays for personnel is presently carried out by a number of well-established methods described in "Radiation Dosimetry" Vol. II, Edited by F. H. Attix and W. C. Roesch, Academic Press, N.Y. 1966, including the photographic film badge, small portable ionization chambers, and thermoluminescent (TL) detectors. The dosimetry of fast neutrons for personnel poses many technical difficulties. Present methods include threshold detectors, nuclear track registration in plastics or other suitable materials, and photographic method using nuclear track emulsions. There is, prior to this proposal, no unified system which can measure directly the combined (corectly added) doses in a mixed field containing both gamma rays and fast neutrons. The threshold detector method, as described in "Nuclear Radiation Detection" by W. J. Price, McGraw Hill, N.Y. 1958, pp 335, 343, involves the irradiation of various elements or isotopes having suitable energy thresholds for neutron activation, and the subsequent examination of the radioactivity induced by the neutrons. The nuclear track registration method, as described in E. T. Agard, R. E. Jervis and K. G. McNeill, Health Phys. 21, 625-630 (1971), involves the chemical etching of damage tracks in certain plastics or other materials due to recoil nuclei, or to fission fragments from threshold detectors. The photograhic method, as described in F. H. Attix and W. C. Roesch, Op. Cit. pp 361-377, involves the microscopic examination of the tracks of recoil protons in nuclear track emulsions.

Limitations of the present methods for gamma dosimetry include the following: For the photographic method poor sensitivity and unpredictable effects due to humidity, as discussed in K. Becker, Health Phys. 23, 729-737 (1972), also R. E. Zelac, Health Phys. 15, 545 (1968). Ionization chambers are limited by size, cost and liability to physical damage.

Limitations of present methods of fast neutron personal dosimetry include, for the threshold detector method, low sensitivity, low accuracy and complexity. The nuclear track registration method is limited by inherent difficulties in controlling the etching process (which has not so far progressed beyond a laboratory technique), and by the difficulty in relating the number-density of the tracks to incident dose. If threshold detectors are used as radiators of tracks, in an attempt to improve the relationship of reading to dose, the method additionally shares the limitations inherent in threshold detectors. The photographic method is limited by fading of the tracks, as described by K. Becker, Health Phys. 23, 729-737 (1972), also by R. E. Zelac, Health Phys. 15, 545 (1968), and by the magnitude of the task of visual inspection and counting of the tracks. A great deal of operator time, and much laborious microscope work is involved in reading films.

It has been found that, in smmary, the prior art falls rougly into two groups, i.e. patents related to thermoluminescence and patents for neutron detectors. This is appropriate as the present invention is, among other things, for a type of thermoluminescent neutron detector. The thermoluminescent patents are concerned with either readout equipment for existing thermoluminescent materials or with production techniques for fabricated thermoluminescent materials. Of previous patents known to us none is for a fast neutron detector nor could any be used as one.

Prior patents for neutron detectors are based upon the counting, by suitable detectors, of radioactive neutron-activation products or fission fragments from fission foils or upon the use of photographic film with convertor-radiator foils, or upon the use of scintillaton detectors to measure neutron effects. Of the patents known to us, none uses thermoluminescence and none of the devices can measure both gamma ray dose and fast neutron dose.

The present invention clearly distinguishes from the prior art known to us in that it provides a miniature portable thermoluminescent detector which will measure fast neutron dose, or gamma dose, or any combination of the two, on an equal basis and give a reading representing their sum.

The device proposed is differentiated from other previous proposals for thermoluminescent detectors in that it measures both gamma-ray dose and fast neutron dose, and moreover does so on an equal basis, so that the absorbed dose in rads due to one species of radiation (e.g. gamma rays) is added arithmetically to the dose due to the other species (e.g. neutrons) to produce a summed dose. Because, for acute effects to the human body (i.e. massive severe radiation injury or death), the quality fastor is approximately 1, simple arithmetic summation of the doses is required.

Our proposal is for the use of a suitable powdered TL material (or "phosphor"), embedded in a suitable hydrogenous plastic matrix. The mixture is cast or pressed into discs, which are worn on the body of the person whose radiation dose is to be monitored. The proposal relates specifically to the type of hydrogenous material to be used, and to the necessary production steps to be followed, as well as to the suitable types of phosphor and to the requirements of phosphor preparation.

The use of a TL phosphor in a hydrogenous matrix is not new, and was the subject of Canadian Pat. No. 841,137, Robert A. Facey, 5 May 1970. The present proposal involves the measurement of TL due to the electron fluence from the matrix into the phosphor in order to measure gamma ray dose. Similarly, the TL due to the recoil proton fluence from the matrix into the phosphor is used to measure the fast neutron dose. Both quantities can be made proportional to the absorbed dose in human soft tissue, and hence the two dose components can be correctly added by the phosphor in a mixed field.

The invention broadly comprises hot pressing die for forming a thermoluminescent detector composition for use with a UV filter, said detector comprising a phosphor matrix formed of thermoluminescent mineral fluorite natural calcium fluoride ($CaF_2$) phosphor particles of between 1 and 10 micrometers in diameter and chemically cross-linked polyethylene particles, the hydrogen content of the matrix being about 14% by weight, said phosphor being an U.V. emitter and to a method of fabricating the same.

It is a feature of the invention to provide a die press for forming a thermoluminescent detector.

In accordance with the foregoing object, the invention broadly comprises a barrel closed at one end and open at the other end, a piston which is slidable within said barrel, a first insert disposed within said barrel and abutting the closed end thereof, a second insert disposed and slidable within said barrel and spaced from said first insert to provide a space for a quantity of the said chemical compound, the said second insert being pressed into engagement with said compound by the said piston exerting a force on the second insert, the coefficient of linear expansion of the first and second inserts being greater than that of the barrel whereby the lateral forces and the sealing between the inserts and the barrel is enhanced at elevated temperatures.

The invention will now be described with reference to the accompanying drawings, in which.

For convenience, the Appendix provides definitions of terms used.

Figure 1:
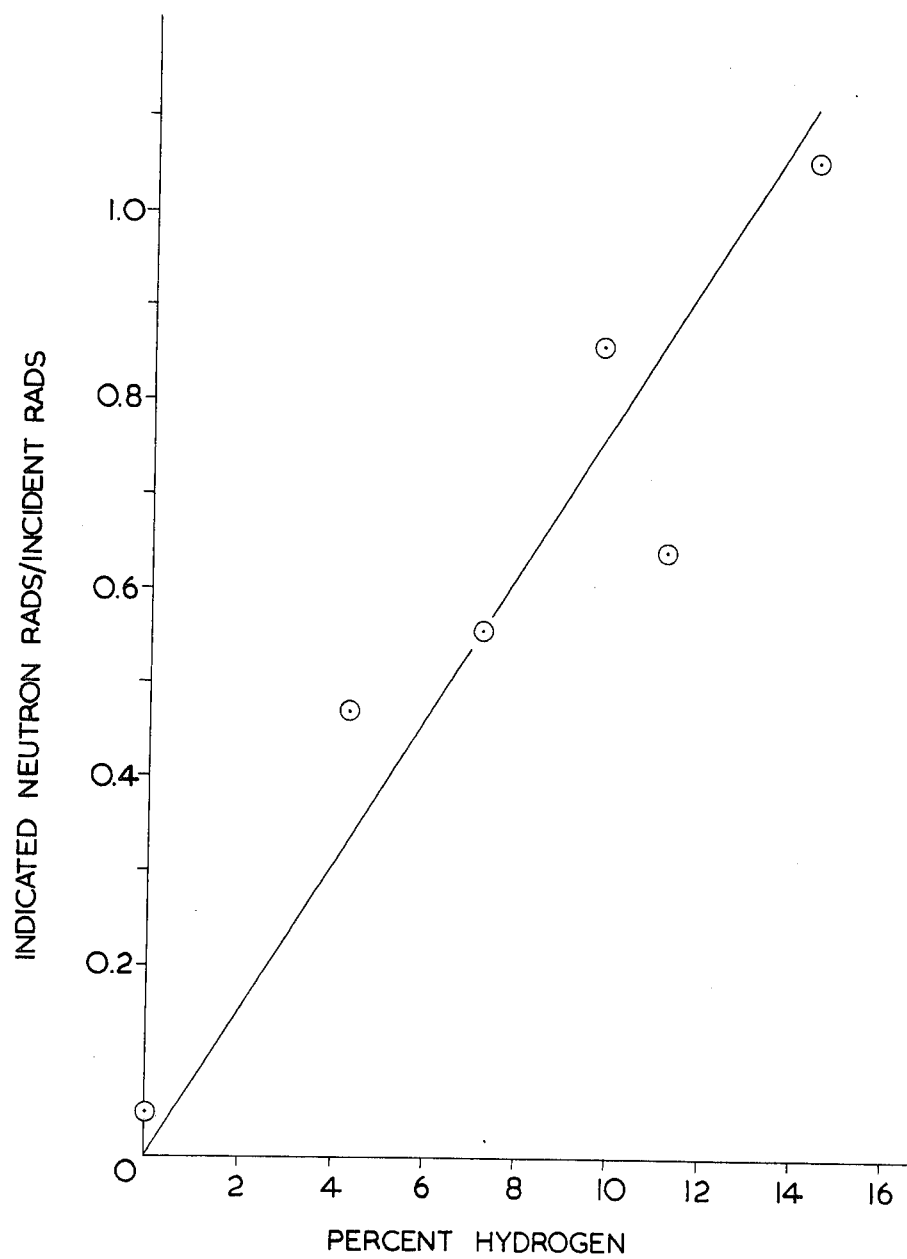
FIG. 1 is a graph showing the ratio (indicated Neutron Rads/Incident Rads) plotted against percent hydrogen.

Our experimental work further shows that the fast-neutron response of the phosphor matrix combination at a given neutron energy is an approximately linear function of the hydrogen content of the matrix, (see FIG. 1). We propose that the hydrogen content of the matrix should not be less than that of polyethylene ("PE"), i.e. not less than 14% H by weight but preferably about 14%. Because of the low melting point ($\sim 130°$ C) and ease of oxidation of PE, we propose the use of cross-linked PE, which has a sufficiently high melting point, and improved resistance to high temperature oxidation. This material can be produced by either chemical cross-linking ("XPE"), or by the irradiation of conventional PE ("IPE"). Chemically cross-linked polyethylene is avalable from Union Carbide Corporation under the trade name of "Vulcanizable Polyethylene, HFDY-45-75". Either type can produce satisfactory detectors.

Because of large amounts of stored energy, following the irradiation for cross-linking, IPE shows a background photoinduced TL signal, which interfers with the phosphor signal, and which prevents the measurement of low doses. XPE shows rather similar behaviour, perhaps also related to available electronic energy. The TL from IPE extends at least from the orange to the blue end of the visible spectrum, and is maximum in the green. This problem is overcome in our proposal by the use of a phosphor which emits in the ultra-violet (UV) region of the spectrum, and by reading the detector through an optical filter (e.g. Corning (Trademark) 7—54), which absorbs the visible, and transmits the UV.

The choice of phosphor is limited to those few which show substantial UV emission spectra. Of these beryllium oxide (BeO) is suitable if precautions are taken in view of its extreme toxicity in powdered form. Silver-activated lithium tetraborate ($Li_2B_4O_7$:Ag) has only recently been discovered (J. J. Thompson and P. L. Ziemer, Health Phys. 25, 435–441 (Oct. 1973)), and has not yet been studied. A suitable phosphor is the mineral fluorite or refined (natural calcium fluoride, $CaF_2$), which emits in both the visible and the UV. Suitable types of fluorite occur in abundant supply at St. Lawrence, Newfoundland, or in the State of Santa Catarina, Brazil, as well as in the European mines (location not specified) of the M.B.L.E. Company, Brussels, Belgium.

Figure 2:
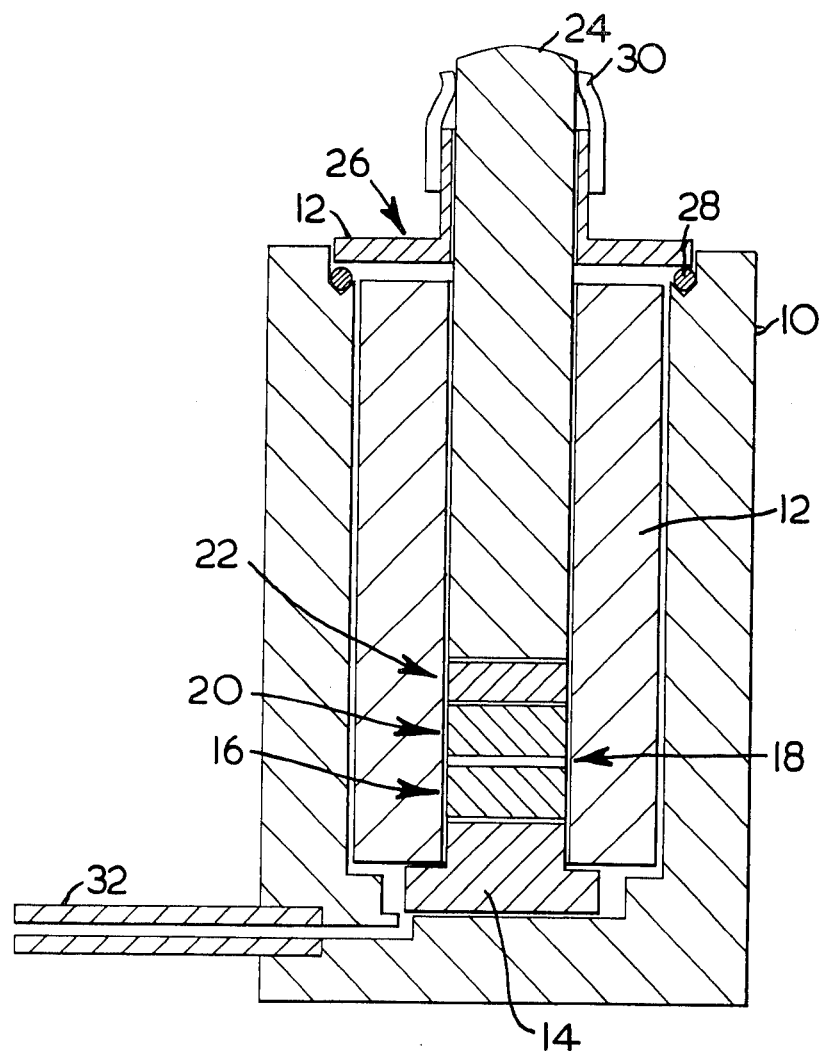
FIG. 2 is a cross-sectional view of a suitable tool for forming detector discs.

A satisfactory detector can be manufactureed from IPE as follows: PE spheres of between 1 and 20 micrometers diameter are irradiated with 100 megarads of $^{60}Co$ gama rays. This produces IPE with a melting point in excess of 350° C and a satisfactory resistance of oxidation. The IPE spheres are now intimately blended with very finely powdered particles (of between 1 and 10 micrometers) of TL fluorite of comparable diameter, in a suitable ratio, e.g. 10% of fluorite by weight. This blend is then placed in suitable aliquots (e.g. 100 mg of powder in a 1.3 cm circular die) in a steel die designed for hot-pressing. Aluminum inserts, or other appropriate sealants, may be necessary in the die to prevent leakage under pressure. The die is then evacuated of air. The powder is compressed at 5000 kg/cm² and the die heated. Hot pressing is carried out at 300° C and 7900 kg/cm² for a duration of 15 minutes. The resulting disc, after cooling, is suitable for use, or it may be subdivided (e.g. into 3 × 3 × 1 mm squares) by cutting. A sketch of the die and its inserts is shown in FIG. 2.

The die is generally indicated at 1 and comprises a jacket 10 for receiving a steel barrel 12 having a foot 14 upon which rests a first aluminum insert. The detector matrix 18 is placed upon the first aluminum insert 16 followed by a second aluminum insert 20 and a steel insert 22. It was found that the only effective method of preventing high temperature leakage between the barrel walls of the die and the inserts was to make them of aluminum which has a much higher coefficient of thermal expansion than has the steel barrel. The differential between the expansion coefficient of the aluminum and steel exerts a great lateral force between the inserts and the barrel, thereby improving the seal. Pressure may be applied to the steel insert by a piston 24. The barrel 10 is rendered vacuum tight by a cap 26 and an "O" ring 28 and a heat resistant silicone-rubber sleeve 30. The interior of the barrel 10 may be evacuated by a vacuum-connector 32.

The detector, so made may be read with a conventional TL reader (using the customary $N_2$ atmosphere), provided that UV filtration is used, and that the heating controls and integration period are suitably adjusted. Photomultipliers with conventional windows can function satisfactorily, but some advantage may be gained if a UV photomultiplier with a quartz window is substituted. The detector will function over almost the whole of the gamma ray spectrum, and over the greater part of the fast neutron spectrum, the results being more accurate at the higher neutron energy end.

Other embodiments falling within the terms of the appended claims will occur to those skilled in the art.

FORM (A)

THERMOLUMINESCENT DETECTOR FOR MIXED GAMMA AND FAST NEUTRON RADIATIONS

APPENDIX "A" - Definitions

Dose — "Dose" or "Absorbed Dose"(1) is energy deposited in an irradiated material per unit mass of material. The unit is the Rad = 100 ergs/g. A measurement of the energy imparted to a unit mass of a hydrogen-containing material by the recoil protons (i.e. the "proton does") can be a measure of the energy imparted to a unit mass of the material by the incident fast neutrons (i.e. the fast neutron dose).

Proton Recoil — Fast neutrons impart energy to matter by interactions (collisions) with atomic nuclei. The recoiling nuclei lose their energy by producing ionization. The most significant interaction (and also the most frequent in all biological materials) is with hydrogen nuclei (protons).

Hazard — The hazard to an individual is the dose equivalent (2), i.e. the product of the dose in rads and other factors such as quality factor (QF), and the dose distribution factor. The unit for radiation protection is the Rem = Rad × factors. However for accident, disaster of military dosimetry for acute radiation effects, the QF for fast neutrons = 1, and gamma rays (which also have a QF of 1) and fast neutrons should have their doses added on a one-for-one basis.

Fast Neutrons — Neutrons of energy between 0.01 and 20 MeV are usually classified as fast. For the purposes of personnel dosimetry, or hazard to humans, the range of interest is mainly above 0.5 MeV, and this is the definition of "fast neutrons" for the present application.

Hydrogenous Plastic — is a plastic material which contains hydrogen in the polymer molecule. Almost all organic plastics are hydrogenous, though differing in their percent hydrogen content. Teflon is the best known example of a non-hydrogenous plastic.

Thermoluminescence (TL) — A TL material stores up energy when exposed to ionizing radiation. At a given temperature, this energy may remain trapped for periods of a few seconds to many thousands of years. When the material is subsequently heated, the energy is released in the form of light. This may be measured by a photomultiplier in a TL reader, and the reading is usually proportional to the absorbed radiation dose.

Photo-induced TL — A form of TL in which the stored energy may not be available during the normal heating of the readout cycle. After exposure to daylight, or to fluorescent light, there may be an optical transfer of the energy into shallower traps, from which it then appears during a subsequent readout.

Flux and Fluence — A flux of particles is a measure of their rate of flow through a given area, e.g. number of neutrons per square centimeter per second. A fluence is a flux integrated with respect to time, e.g. number of neutrons per square centimeter.

The embodiments of the invention in which an exclusive property or privilege is claimed are defined as follows:

1. A hot-pressing die for processng discs of chemical compounds, said die comprising:
   i. a barrel closed at one end and open at the other end,
   ii. a piston insert is slidable within said barrel,
   iii. a first inset disposed within said barrel and abutting the closed end thereof,
   iv. a second insert disposed and slidable within said barrel and spaced from said first insert to provide a space for a quantity of the said chemical compound, the said second insert being pressed into enegagement with said compound by the said piston exertng a force on the second insert, the coefficient of linear expansion of the first and second inserts being greater than that of the barrel whereby the lateral forces and the sealing between the inserts and the barrel is enhanced at elevated temperatures.

2. A hot-pressing die as defined in claim 1 further including an evacuable jacket for enclosing said barrel and piston, said jacket having an aperture through which the said piston may slide, said aperture and said piston being provided with a gas seal therebetween.

3. A hot-pressing die as defined in claim 2 further including evacuation connecton means in the said jacket.

4. A hot-pressing die as defined in claim 1 further including a third insert disposed between said piston and said second insert, said third insert having a linear coefficient of expansion which is less than that of the first and second inserts.

5. A hot-pressing die as defined in claim 1 wherein the closed end of said barrel is provided with a removable plug.

* * * * *